United States Patent
Zschocke et al.

(10) Patent No.: US 12,251,972 B2
(45) Date of Patent: Mar. 18, 2025

(54) VIBRATION DAMPER AND MOTOR VEHICLE WITH ACTIVE SUSPENSION

(71) Applicants: Dr. Ing. h.c. F. Porsche Aktiengesellschaft, Stuttgart (DE); ZF Friedrichshafen AG, Friedrichshafen (DE)

(72) Inventors: Swen Zschocke, Wiernsheim-Serres (DE); Robert Schreiber, Friedrichroda (DE); Rainer Beilner, Bergrheinfeld (DE)

(73) Assignees: Dr. Ing. h.c. F. Porsche Aktiengesellschaft (DE); ZF Friedrichshafen AG (DE)

( * ) Notice: Subject to any disclaimer, the term of this patent is extended or adjusted under 35 U.S.C. 154(b) by 0 days.

(21) Appl. No.: 18/766,982

(22) Filed: Jul. 9, 2024

(65) Prior Publication Data
US 2025/0018757 A1    Jan. 16, 2025

(30) Foreign Application Priority Data
Jul. 13, 2023   (DE) .......................... 102023118619.1

(51) Int. Cl.
*B60G 13/14* (2006.01)
*B60G 11/27* (2006.01)

(52) U.S. Cl.
CPC .............. *B60G 13/14* (2013.01); *B60G 11/27* (2013.01); *B60G 2202/152* (2013.01); *B60G 2202/24* (2013.01)

(58) Field of Classification Search
CPC .. B60G 13/14; B60G 11/27; B60G 2202/152; B60G 2202/24
See application file for complete search history.

(56) References Cited

U.S. PATENT DOCUMENTS

| | | | |
|---|---|---|---|
| 9,310,810 B2 * | 4/2016 | Förster | ..................... F16F 15/03 |
| 2013/0207355 A1 * | 8/2013 | Pavuk | ..................... B60G 11/27 |
| | | | 280/124.157 |

(Continued)

FOREIGN PATENT DOCUMENTS

| | | | | |
|---|---|---|---|---|
| CN | 117145911 A | * | 12/2023 | ................ F16F 9/02 |
| DE | 10025399 A1 | * | 12/2000 | .............. F16F 9/325 |

(Continued)

*Primary Examiner* — Paul N Dickson
*Assistant Examiner* — Matthew D Lee
(74) *Attorney, Agent, or Firm* — Buchanan Ingersoll & Rooney PC (57) ABSTRACT

A vibration damper with a damper piston which is arranged in a main tube with hydraulic medium and can be moved to and fro in an axial direction relative to the main tube. The main tube is arranged in a container tube, wherein an intermediate tube is arranged between the main tube and the container tube. The main tube, the intermediate tube and the container tube are arranged coaxially in a three-tube damper. The damper piston is attached at one end of a piston rod. The three-tube damper is equipped with a hydraulic end-position damping and at its end opposite the piston rod, has a central valve block with two damper valve devices. The central valve block is partially fitted with an air spring resting on an axial support ring which is connected by a single main weld seam to the container tube and central valve block by substance bonding.

9 Claims, 6 Drawing Sheets

(56) References Cited

U.S. PATENT DOCUMENTS

| | | | |
|---|---|---|---|
| 2016/0363185 A1* | 12/2016 | Noguchi | F16F 9/06 |
| 2018/0154725 A1* | 6/2018 | Pniewski | F16F 9/0454 |
| 2020/0232532 A1* | 7/2020 | Ruhmann | F16F 9/46 |
| 2024/0068542 A1* | 2/2024 | Schell | F16F 9/465 |
| 2024/0191769 A1* | 6/2024 | Henderickx | B60G 13/08 |
| 2024/0217294 A1* | 7/2024 | Ejbeh-Agby | F16F 9/3271 |
| 2024/0360887 A1* | 10/2024 | Fratton | F16F 9/0472 |

FOREIGN PATENT DOCUMENTS

| | | | |
|---|---|---|---|
| DE | 102011085664 A1 * | 3/2013 | B60G 11/27 |
| DE | 102012009220 A1 | 10/2013 | |
| DE | 112012003932 T5 | 8/2014 | |
| DE | 102015209179 A1 | 11/2016 | |
| DE | 102019108092 B4 | 9/2022 | |
| DE | 102022201909 A1 * | 8/2023 | F16F 9/3242 |
| KR | 20090082819 A * | 7/2009 | B60G 11/26 |
| WO | 2013042569 A1 | 3/2013 | |

* cited by examiner

VIBRATION DAMPER AND MOTOR VEHICLE WITH ACTIVE SUSPENSION

CROSS-REFERENCE TO RELATED APPLICATION

This application claims priority to German Patent Application No. 10 2023 118 619.1, filed Jul. 13, 2023, the content of such application being incorporated by reference herein in its entirety.

FIELD OF THE INVENTION

The invention concerns a vibration damper with a damper piston which is arranged in a main tube with hydraulic medium and can be moved to and fro in an axial direction relative to the main tube, wherein the main tube is arranged in a container tube, wherein an intermediate tube is arranged between the main tube and the container tube, wherein the main tube, the intermediate tube and the container tube are arranged coaxially in a three-tube damper, wherein the damper piston is attached at one end of a piston rod, wherein the three-tube damper is equipped with a hydraulic end-position damping and at its end opposite the piston rod has a central valve block with two damper valve devices.

BACKGROUND OF THE INVENTION

German publication DE 11 2012 003 932 T5, which is incorporated by reference herein, of the international specification WO 2013/042569 A1, which is incorporated by reference herein, and German patent application DE 10 2019 108 092 B4, which is incorporated by reference herein, disclose vehicle shock absorbers in which a valve block is welded to an outer tube. German publication DE 10 2015 209 179 A1, which is incorporated by reference herein, discloses a cylinder tube for a motor vehicle shock absorber, wherein fastening sleeves of an external housing receiving a valve are fixed by substance bonding to a connecting surface of the cylinder tube. German publication DE 100 25 399 A1, which is incorporated by reference herein, discloses a motor vehicle shock absorber in which a valve housing is welded to an accumulator tube. German publication DE 10 2012 009 220 A1, which is incorporated by reference herein, discloses a motor vehicle shock absorber in which a spring receiving ring is fastened by substance bonding to a cylinder portion defining a secondary volume.

SUMMARY OF THE INVENTION

Described herein is a vibration damper with a damper piston which is arranged in a main tube with hydraulic medium and can be moved to and fro in an axial direction relative to the main tube, wherein the main tube is arranged in a container tube, wherein an intermediate tube is arranged between the main tube and the container tube, wherein the main tube, the intermediate tube and the container tube are arranged coaxially in a three-tube damper, wherein the damper piston is attached at one end of a piston rod, wherein the three-tube damper is equipped with a hydraulic end-position damping and at its end opposite the piston rod has a central valve block with two damper valve devices, wherein the central valve block is partially surrounded by an air spring resting on an axial support ring which is connected by a single main weld seam to the container tube and central valve block by substance bonding, wherein at its end on the piston-rod side, the three-tube damper has a gas compensation volume which is arranged in an annular space between the intermediate tube and the container tube. This firstly provides a vibration damper or shock absorber which allows very comfortable operation of a motor vehicle equipped with the vibration damper or shock absorber, at both high frequencies and low frequencies. At the same time, it elegantly resolves a conflict in installation space, resulting from the combination of the is gas compensation volume and the air spring on the three-tube damper. On the piston-side end of the three-tube damper, the annular space between the intermediate tube and the container tube is effectively used to accommodate the gas compensation volume. The gas compensation volume is advantageously provided with a gas bag containing a gas such as air. The gas bag is made from a gas-tight flexible material. The gas bag lies between the intermediate tube and the container tube and is connected with a bayonet valve. During operation of the vibration damper, the gas bag ensures a separation between oil and gas. In addition, the gas bag prevents any foaming of the oil. On the end of the three-tube damper facing away from the piston rod, particularly advantageously, by partially surrounding the central valve block with the air spring, a sufficiently large air volume can be provided for the latter. The resulting disadvantage with respect to connection of hydraulic lines to the central valve block is knowingly accepted. The two damper valve devices advantageously each comprise a check valve. One of the damper valve devices also comprises an extension stage valve. The other damper valve device advantageously comprises, in addition to the check valve, a compression stage valve. The central valve block is preferably a milled part. The main weld seam allows the air spring to be axially supported in a simple and stable fashion on the lower end of the container tube and the central valve block.

A preferred exemplary embodiment of the vibration damper is characterized in that the axial support ring has a rectangular ring cross-section. Thus the application of the weld seam on the axial support ring, container tube and central valve block is substantially simplified.

A further preferred exemplary embodiment of the vibration damper is characterized in that the axial support ring is combined with a support sleeve which surrounds the container tube on the outside. This firstly increases the stability of the container tube at the end with the axial support ring. In addition, the support sleeve provides a particularly simple form of extension control for the air spring, supported on the axial support ring, in the fitted state.

A further preferred exemplary embodiment of the vibration damper is characterized in that at its end facing away from the axial support ring, the support sleeve has a chamfer on the outside. This simplifies mounting and attachment of the air spring.

A further preferred exemplary embodiment of the vibration damper is characterized in that the support sleeve is combined with an adapter body which serves to provide an axial extension control for the air spring sitting on the axial support ring. This considerably simplifies mounting of the air spring.

A further preferred exemplary embodiment of the vibration damper is characterized in that the air spring has an air spring housing which is fixed to the adapter body by a snap or latch connection in an axial direction. Snap hooks or latch hooks for providing the latch or snap connection are advantageously provided on the air spring housing, in particular on a lower part of the air spring housing. Here, both the air spring housing and the adapter body are advantageously formed from a plastic material. This allows low-cost production in large quantities, for example in an injection moulding process.

A further preferred exemplary embodiment of the vibration damper is characterized in that the main weld seam is arranged on a ring face of the axial support ring facing the central valve block. This simplifies welding of the axial support ring to the container tube and central valve block.

A further preferred exemplary embodiment of the vibration damper is characterized in that the main weld seam is arranged on an outer circumferential face of a base block of the central valve block. The base block has for example the shape of a straight circular cylinder.

The main weld seam advantageously extends fully circumferentially around the container tube on the outside. This achieves, in a simple fashion, a very stable fastening of the axial support ring on the container tube and on the central valve block.

The invention furthermore concerns a motor vehicle with active suspension which comprises at least one above-described vibration damper. The claimed motor vehicle advantageously comprises a front axle and a rear axle, each equipped with a motor-pump unit and two vibration dampers.

The invention furthermore concerns a container tube, an intermediate tube, a main tube, a central valve block, an axial support ring, a support sleeve and/or an adapter body for an above-described vibration damper. Said parts may be made available separately.

BRIEF DESCRIPTION OF THE DRAWINGS

Further advantages, features and details of the invention arise from the following description in which various exemplary embodiments are described in detail with reference to the drawing. In the drawings.

DETAILED DESCRIPTION OF THE INVENTION

Figure 1:
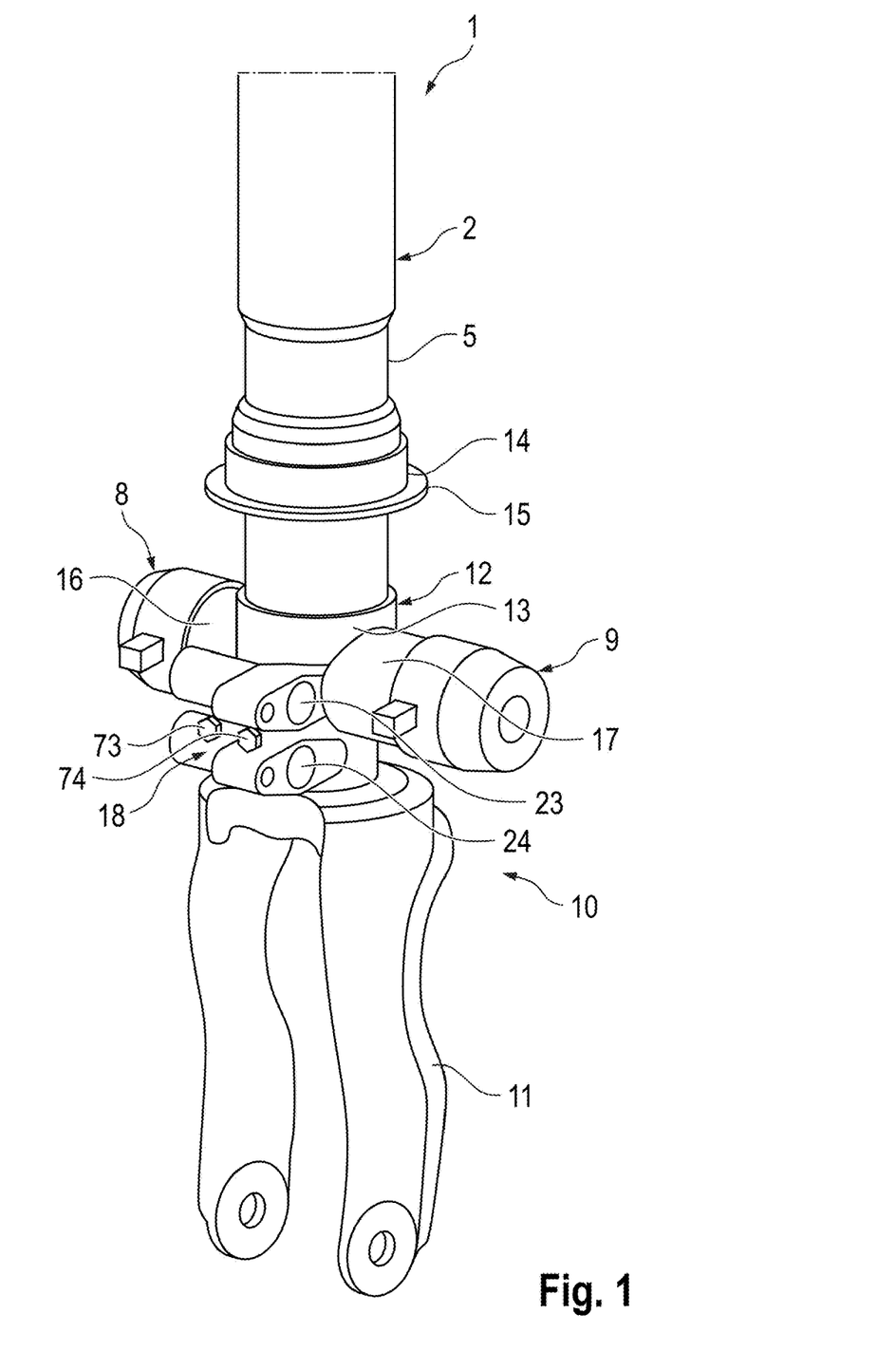
FIG. 1 shows a perspective illustration of a spring strut with a three-tube damper.
Figure 2:
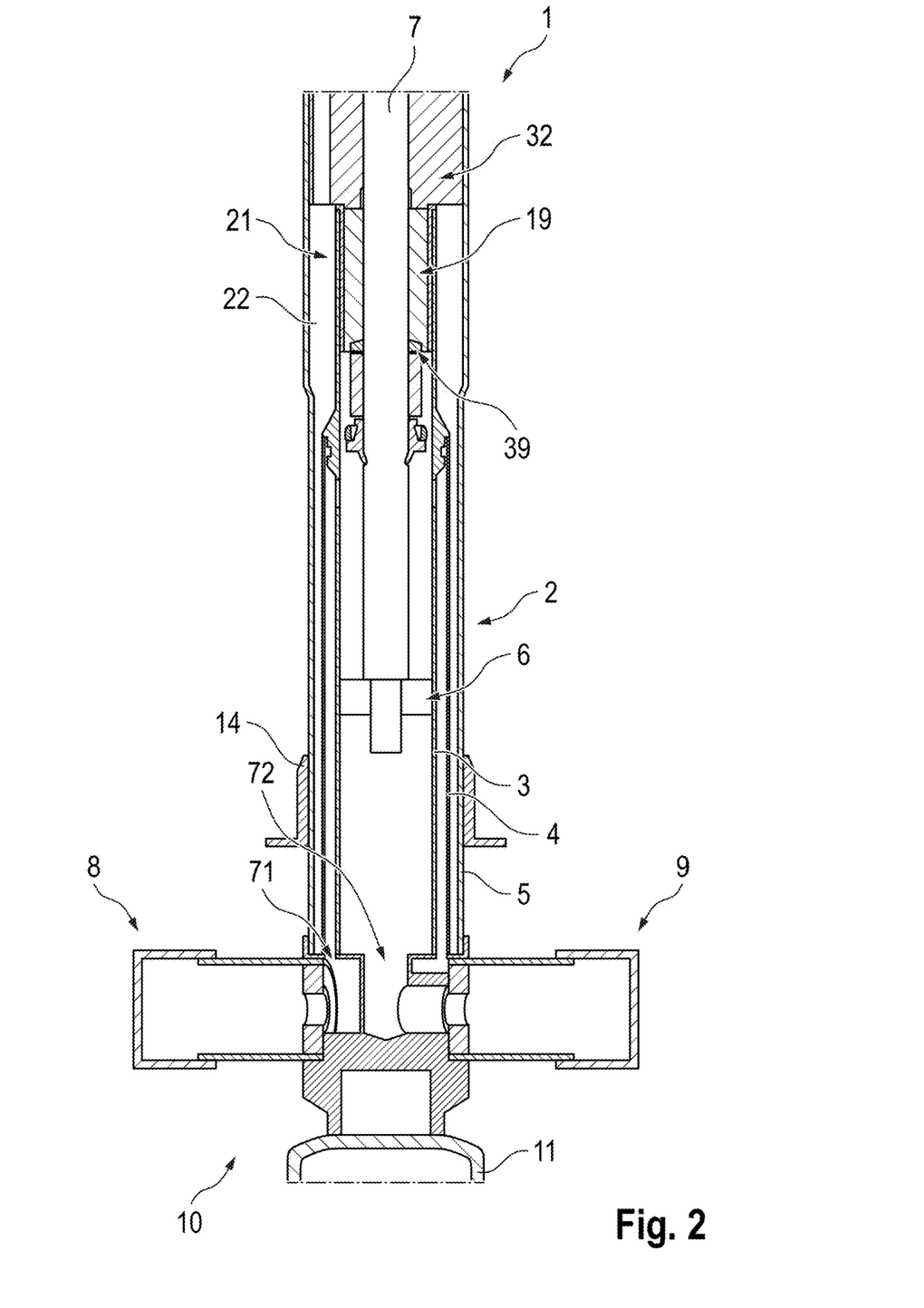
FIG. 2 shows a three-tube damper from FIG. 1 in a schematic sectional illustration.
Figure 3:
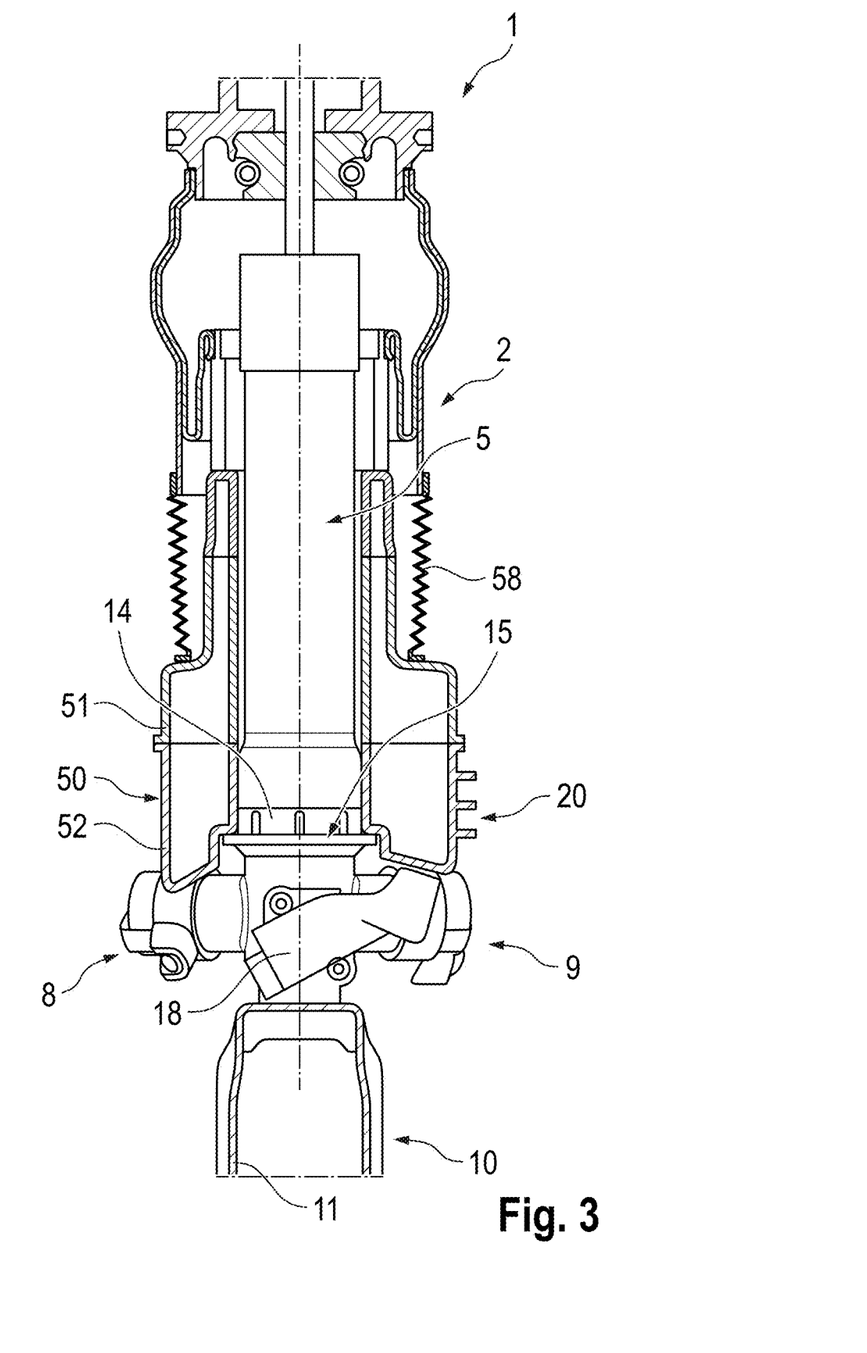
FIG. 3 shows the three-tube damper from FIG. 1 in a longitudinal sectional illustration, wherein a container tube of the three-tube damper is shown not cut.

FIGS. 1 to 3 show various views of a spring strut 10 with a spring fork 11. The spring strut comprises a vibration damper 1, also known as a shock absorber. The vibration damper 1 is configured as a three-tube damper 2 with a main tube 3, an intermediate tube 4 and a container tube 5.

The spring strut 10 with the vibration damper 1 configured as a three-tube damper 2 is part of a hydraulic system which, in a motor vehicle, serves to provide active damper control during operation of the motor vehicle. The motor vehicle preferably comprises four wheels, each of which has an assigned vibration damper 1 configured as a three-tube damper 2. The three-tube damper or vibration damper is referred to below in brief as a damper. The hydraulic damper serves as a shock absorber in an active suspension of a motor vehicle.

The three-tube damper 2 is operated with a hydraulic medium. The hydraulic medium is preferably a hydraulic fluid, also known as hydraulic oil or also in brief as oil. The hydraulic damper, in addition to a hydraulic damper volume, comprises a gas compensation volume 21.

The active damper control comprises a hydraulic actuator device which is hydraulically connected to the dampers by hydraulic lines. The hydraulic actuator device in the active suspension of the motor vehicle serves to excite or actuate the hydraulic dampers in targeted fashion. To this end, the hydraulic actuator device advantageously comprises a separate hydraulic pump for each damper. Two hydraulic pumps may be combined in a motor-pump unit for each axle of the motor vehicle. The hydraulic pumps assigned to the respective axle can advantageously be actuated separately via a common control unit.

A damper piston 6 is guided movably up and down in FIG. 2 in the main tube 3 of the three-tube damper 2. A piston 7 starts from the damper piston 6, and in FIG. 2 extends upward from the three-tube damper 2 through a seal guidance unit 32. An upper end of the piston rod 7 (not shown in FIG. 2) is attached to a carrier structure of the motor vehicle.

The main tube 3, intermediate tube 4 and container tube 5 are arranged coaxially and provided with intermediate spaces in the radial direction. An annular space between the main tube 3 and intermediate tube 4 allows a downward passage of the hydraulic medium, in particular a return of the hydraulic medium, without extra hydraulic lines. An annular space between the intermediate tube 4 and container tube 5 advantageously serves to receive the gas compensation volume 21.

The gas compensation volume 21 is formed by a gas bag 22 received on the end of the three-tube damper 2 on the piston-rod side, i.e. at the top in FIG. 2, between the intermediate tube 4 and the container tube 5. Radially inside the gas compensation volume 21 in the main tube 3, the piston rod 7 is surrounded by a hydraulic end-position damper 19 with a hydraulic extension stop 39.

At its lower end in FIG. 2, three-tube damper 2 is equipped with a central valve block 12. The central valve block 12 integrates two damper valve devices 8 and 9. The damper valve devices 8 and 9 each comprise a check valve.

In addition, the damper device 8 comprises an extension stage valve which is hydraulically connected via a ring gap 71 to the intermediate space, configured as an annular space, between the main tube 3 and the intermediate tube 4. The main tube 3 is connected at the bottom in FIG. 2 to a compression stage valve in the damper valve device 9 via a relatively large central passage hole 72.

The central valve block 12 comprises a base block 13, configured for example as a solid tube body. Externally, the base block 13 for example has the form of a straight circular cylinder casing. The base block 13 is for example formed as a milled part and is attached to the lower end of the three-tube damper 2.

The central valve block 12 furthermore comprises two damper valve blocks 16, 17 which substantially have the form of straight circular cylinders. The two damper valve blocks 16, 17 may be connected integrally to the base block 13. The damper valve blocks 16, 17 serve to receive and/or form the damper valve devices 8 and 9. The two damper valve blocks 16, 17 are arranged coaxially to one another and transversely to the longitudinal axis of the three-tube damper 2.

The central valve block 12 furthermore comprises a connection valve block 18. The connection valve block 18 is formed as a separate part and attached to the base block 13. Two screws 73, 74 for example are used to attach the connection valve block 18 to the base block 13 of the central valve block 12.

The design of the connection valve block 18 as a separate component provides the advantage, inter alia, that a package-dependent design of the vibration damper is possible with a relatively little structural complexity, in particular for fitting in different motor vehicle variants or derivatives. In addition, the separate connection valve block 18 may be configured and arranged on the base block 13 such that special crash requirements for a motor vehicle equipped with the vibration damper 1 can be ideally fulfilled.

With respect to the package-dependent design of the connection valve block 18, in particular the positioning of hydraulic connections 23, 24 is important. The hydraulic connections 23, 24 on the connection valve block 18 serve for connection of hydraulic lines 27, 28, as shown in particular in FIGS. 4 and 5. The three-tube damper 2 can be actively hydraulically actuated via the hydraulic lines 27, 28. To this end, the hydraulic lines 27, 28 are hydraulically integrated in an active damper controller 29, indicated in FIG. 4 merely by a rectangle.

Figure 4:
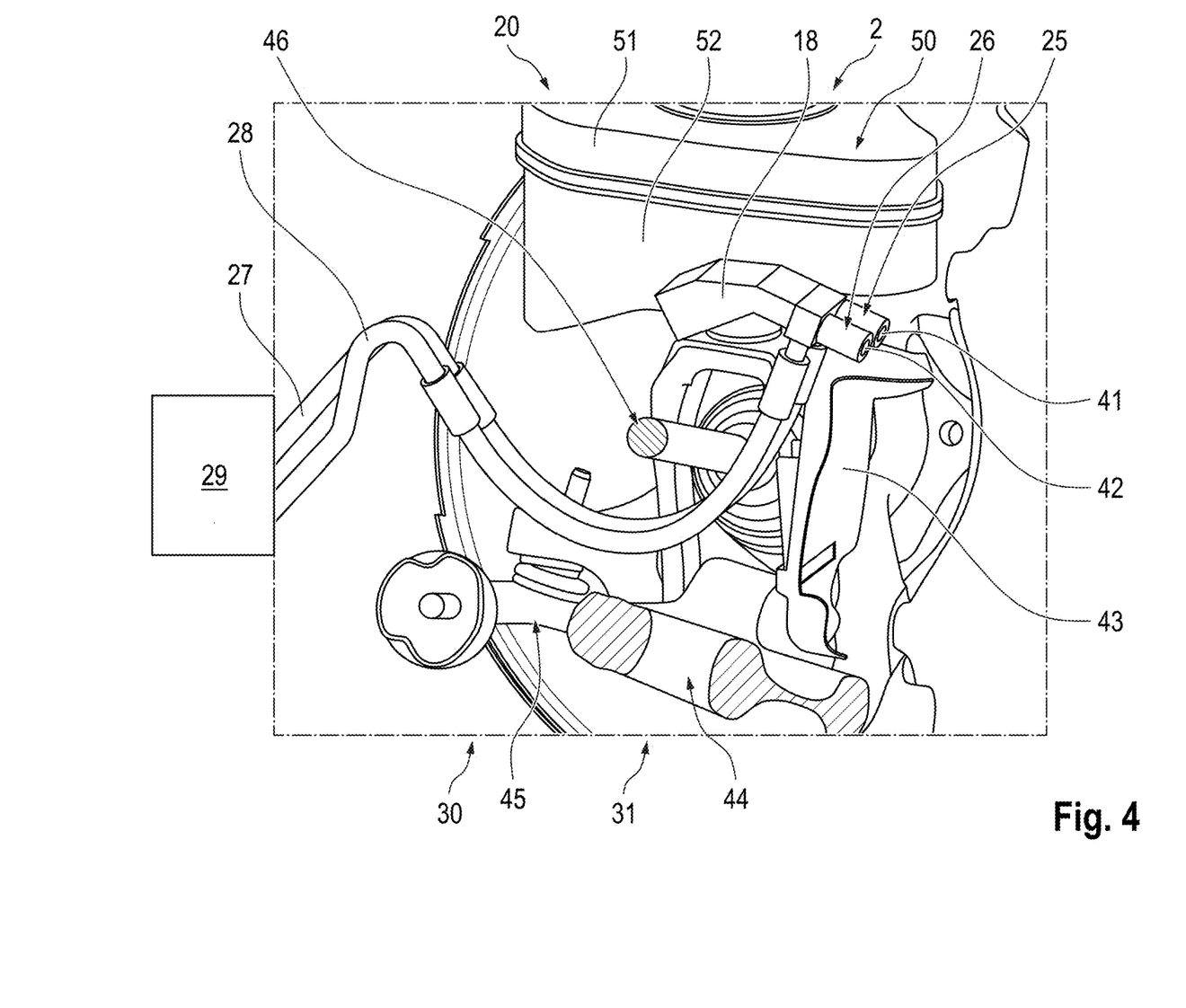
FIG. 4 shows a perspective illustration of a vibration damper with a three-tube damper which is surrounded by an air spring on an end facing a front axle.
Figure 5:
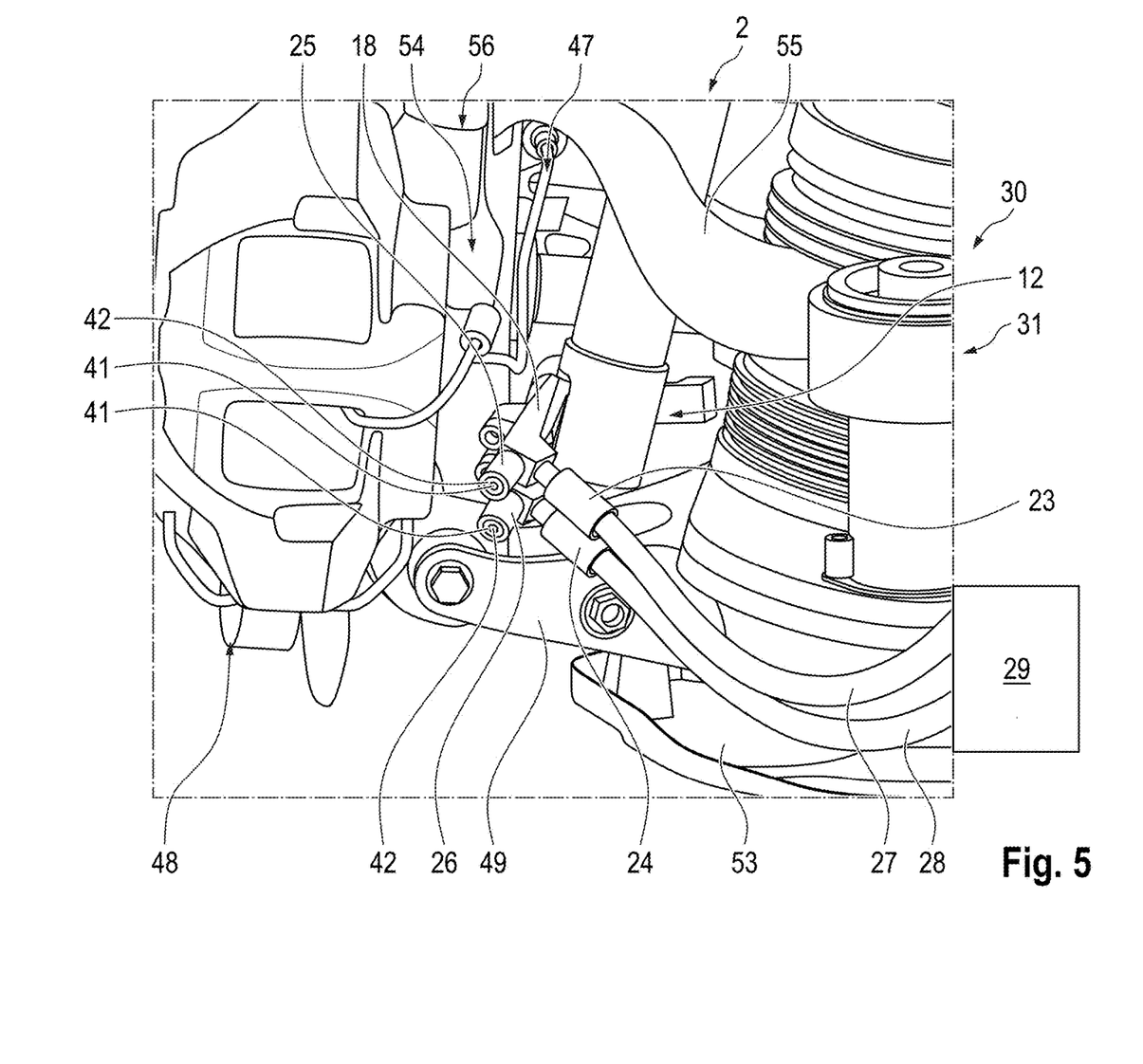
FIG. 5 shows a vibration damper with a three-tube damper assigned to a rear axle of a motor vehicle.

FIGS. 4 and 5 show in perspective how the three-tube damper 2 with the central valve block 12 can be specifically designed at its lower end with respect to installation space, in particular when mounting in a motor vehicle 30 with active suspension 31.

The motor vehicle 30, indicated in FIGS. 4 and 5 only by means of various components 43 to 46 in FIG. 4, and 47 to 49, 53 to 56 in FIG. 5, imposes high requirements on a manufacturer, in particular also because hoses and lines, in particular the hydraulic lines 27, 28, must have sufficient clearance from surrounding components over the entire suspension and steering travel during operation of the motor vehicle 30. Furthermore, bending radii and stretch lengths occurring must be observed.

An additional structural complexity results because the vibration damper 1, configured as a three-tube damper 2, as shown for example in FIG. 3, is also combined with an air spring 20. The air spring 20 is advantageously configured and arranged such that the air spring 20 surrounds the central valve block 12 from the lower end of the three-tube damper 2. This firstly maximises the air spring space which can be provided by the air spring 20. Because of the large volume, the air spring 20 can advantageously be designed softer. Also, packaging advantages result from the design and arrangement of the air spring 20 on and around the central valve block 12.

The air spring 20 comprises an air spring housing 50 with a housing upper part 51 and a housing lower part 52. The air spring housing 50 comprises a single, relatively large volume. The air spring housing 50 extends around the lower end of the three-tube damper 2 with the central valve block 12. In the axial direction, the air spring housing 50 is arranged between a gaiter 58 and the central valve block 12 which is partially surrounded by the housing lower part 52.

The housing lower part 52 of the air spring housing 50 rests on an axial support ring 15 which is attached to the lower end of the three-tube damper 2. The axial support ring 15 is combined with an adapter body 14, which allows the air spring housing 50 to be attached externally to the container tube 5 of the three-tube damper 2. The air spring housing 50 is fastened to the adapter body 14 for example by a snap or latch connection.

FIG. 4 shows how the air spring housing 50 of the air spring 20 surrounds the central valve block 12 so that the connection valve block 18 remains free. In FIG. 4, the three-tube damper 2 is assigned to a front axle of the motor vehicle 30. The component 43 is a brake air supply. The component 44 is a lower control arm. The component 45 is a track rod. The component 46 is a cardan shaft.

FIG. 4 shows how the air spring volume of the air spring 20 extends around the connection valve block 18. Thus a maximum air spring volume can be provided with the air spring housing 50. In addition, FIG. 4 shows that the connection valve block 18 is designed such that, firstly, connection of the hydraulic lines 27, 28 to the central valve block 12 is simplified. In addition, shut-off screws 41, 42 of shut-off valves 25, 26 integrated in the connection valve block 18 remain accessible even when the air spring 20 is mounted.

In FIG. 5, the three-tube damper 2 is assigned to a rear axle of the motor vehicle 30. The component 47 is a further hydraulic line. The component 48 is a brake caliper. The component 49 is a lower control arm. The component 53 is a control arm cover. The component 54 is a holder with a brake line. The component 55 is an upper control arm. The component 56 is a wheel carrier.

FIG. 5 shows that the connection valve block 18 has been deliberately designed to ensure sufficient clearance from the wheel carrier 56 over the entire suspension and steering travel. In addition, the connection valve block 18 and the hydraulic lines 27, 28 and further hydraulic line 47 have been designed to ensure sufficient clearance from the brake periphery over the entire suspension and steering travel.

Figure 6:
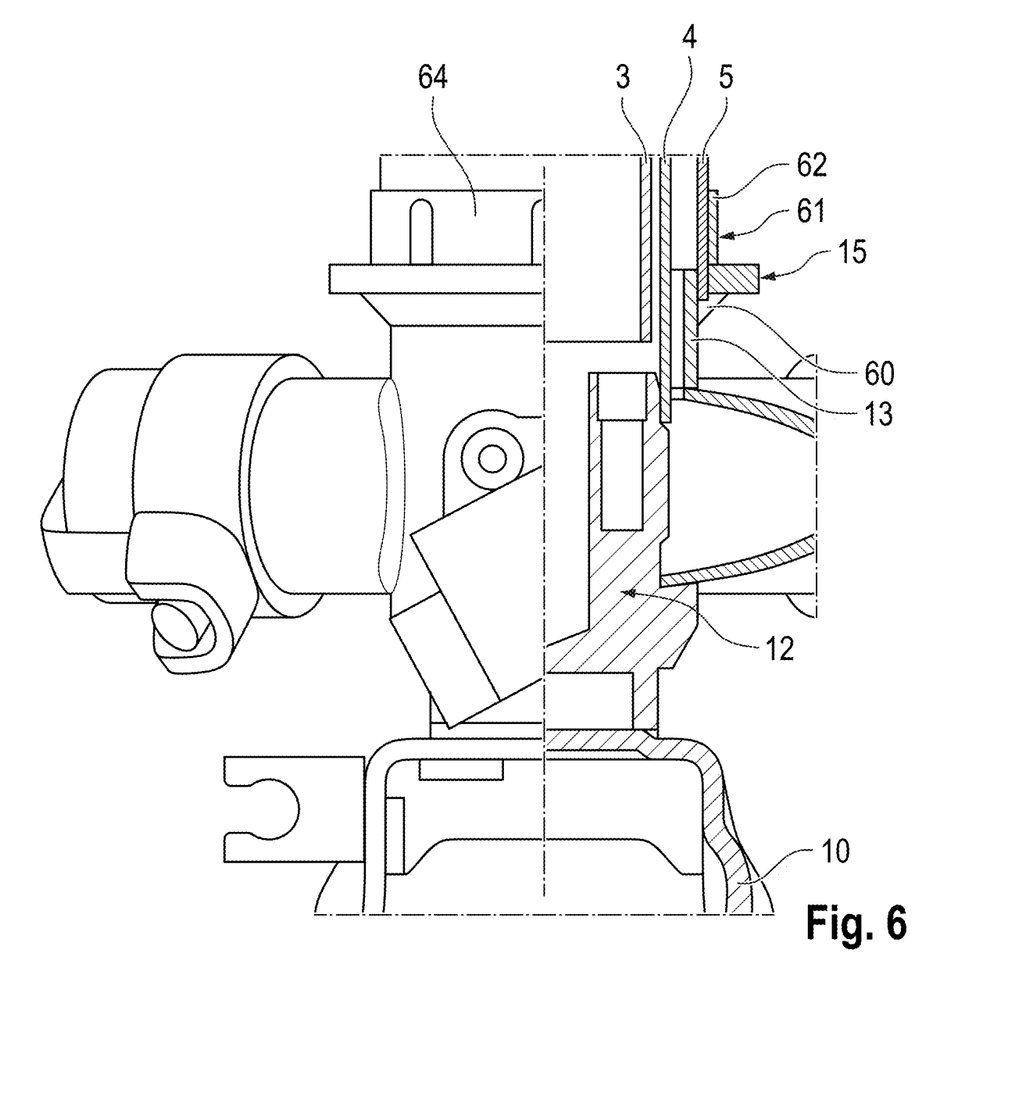
FIG. 6 shows an enlarged extract from FIG. 3 in a half longitudinal section.

FIG. 6 shows an extract from FIG. 3 half cut away. The section view in FIG. 6 shows that the base block 13 of the central valve block 12 is arranged with a short piece—at its upper end in FIG. 6—inside the container tube 5. To this end, the base block may be designed accordingly. This simplifies positioning of the central valve block 12 relative to the container tube 5.

On the lower end of the container tube 5 in FIG. 6, an axial support ring 15 is welded by means of a peripheral main weld seam 60 to both the main container tube 5 and also the central valve block 12, in particular the base block 13 of the central valve block 12. The main weld seam 60 thus connects three components together by substance bonding.

The axial support ring 15 is combined with an axial support sleeve 61. The support sleeve 61 surrounds the container tube 5 above the axial support ring 15. The support sleeve 61 is fixedly connected to the container tube 5. The support sleeve 61 serves firstly to increase the stability of the container tube 5 at its lower end in FIG. 6.

In addition, the support sleeve 61 serves for fastening an adapter body 64 to the container tube 5. The adapter body 64 in turn serves as an extension control for the air spring when the air spring housing 50 is placed on the axial support ring 15. A chamfer 62 simplifies mounting of the adapter body 64.

What is claimed is:
1. A vibration damper comprising:
a container tube;
a main tube arranged in the container tube;
an intermediate tube arranged between the main tube and the container tube;

wherein the main tube, the intermediate tube and the container tube are arranged coaxially to form a three-tube damper, a damper piston arranged in the main tube, wherein the damper piston is configured to be moved to and fro in an axial direction relative to the main tube, wherein the damper piston is attached at one end of a piston rod, wherein the three-tube damper comprises (i) a hydraulic end-position damping and (ii) a central valve block with two damper valve devices arranged at an end of the three-tube damper that is opposite the piston rod, wherein the central valve block is partially surrounded by an air spring resting on an axial support ring, wherein the axial support ring is connected by a single main weld seam to the container tube and the central valve block, wherein on a piston rod side of the three-tube damper, the three-tube damper comprises a gas compensation volume which is arranged in an annular space between the intermediate tube and the container tube.

2. The vibration damper according to claim 1, wherein the axial support ring has a rectangular ring cross-section.

3. The vibration damper according to claim 1, wherein the axial support ring is combined with a support sleeve which surrounds an exterior of the container tube.

4. The vibration damper according to claim 3, further comprising a chamfer disposed on an outside of the support sleeve and at an end of the support sleeve that faces away from the axial support ring.

5. The vibration damper according to claim 3, wherein the support sleeve is combined with an adapter body which serves to provide an axial extension control for the air spring disposed on the axial support ring.

6. The vibration damper according to claim 5, wherein the air spring has an air spring housing which is fixed to the adapter body in an axial direction by a snap or latch connection.

7. The vibration damper according to claim 1, wherein the main weld seam is arranged on a ring face of the axial support ring facing the central valve block.

8. The vibration damper according to claim 1, wherein the main weld seam is arranged on an outer circumferential face of a base block of the central valve block.

9. A motor vehicle with an active suspension that comprises the vibration damper according to claim 1.

* * * * *